L. D. McIntosh M.D.
Uterine-Supporter.

No. 118,378.　　　　　　　　　Patented Aug. 22, 1871.

Witnesses:　　　　　　　　　Inventor:
　　　　　　　　　　　　　　L. D. McIntosh M.D.
　　　　　　　　　　　　Per
　　　　　　　　　　　　　　Attorneys.

UNITED STATES PATENT OFFICE.

LYMAN D. McINTOSH, OF WASECA, MINNESOTA.

IMPROVEMENT IN UTERINE SUPPORTERS.

Specification forming part of Letters Patent No. 118,378, dated August 22, 1871.

*To all whom it may concern:*

Be it known that I, Dr. LYMAN D. McINTOSH, of Waseca, in the county of Waseca and State of Minnesota, have invented a new and Improved Uterine Supporter; and I do hereby declare the following to be a full, clear, and exact description of the same, reference being had to the accompanying drawing making a part of this specification, in which—

Figure 1:
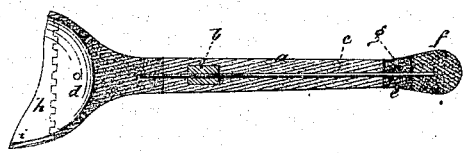
Figure 2:
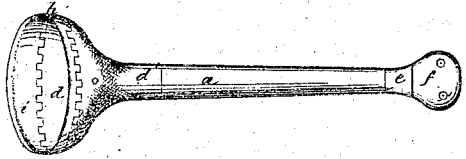

Figure 1 is a sectional elevation, and Fig. 2 is a side elevation.

This invention relates to a uterine supporter having a soft-rubber stem, within which is placed a nut, and also a screw-bolt passing through the nut, said bolt terminating at both ends in hard-rubber parts of the instrument, and being provided with a knob at one extremity, by turning which the screw is rotated and the soft-rubber stem lengthened or shortened accordingly.

Referring to the drawing, $a$ is the soft-rubber stem of the supporter; $b$, the nut placed within the same; $c$, the screw-bolt, inclosed within the stem and passing through the nut; $d$, the cup composed of hard rubber, to the stem of which one end of the soft-rubber tube is vulcanized; $e$, a short hard-rubber tube, to which the other end of the stem $a$ is vulcanized. The bolt $c$ terminates at one end in an orifice in the stem $d'$ of the cup $d$, said bolt passing through the tube $e$ and terminating at the other end in an orifice in the knob $f$, that is firmly secured to the bolt, for the purpose of effecting the turning of the screw by means of the knob. The turning of the screw forward elongates the stem, and by turning the screw backward the stem is shortened. A pin, $g$, passing radially through the tube $e$, enters a circumferential groove in the screw $c$, thus allowing the latter to be rotated freely, and at the same time giving the screw fixedness, except as to its rotary motion. After the right length has been given to the stem it may be bent in any desired curve, the screw being composed of soft iron. A soft-rubber ring, $h$, is vulcanized to the rim of the cup $d$, said ring being extended on one side, as shown at $i$, to be used in cases of leaning of the womb to one side.

Having thus described my invention, what I claim as new, and desire to secure by Letters Patent, is—

1. The combination of the soft-rubber stem $a$, nut $b$, screw $c$, cup $d$ of hard-rubber tube $e$, and knob $f$, as specified.

2. The combination of the cup $d$ of hard-rubber ring $h$ and extension $i$, both of soft rubber, as described.

DR. LYMAN D. McINTOSH.

Witnesses:
H. P. NORTON,
C. P. HEWITT.